C. J. GUSTAFSON.
STARTING DEVICE FOR MOTOR CYCLES.
APPLICATION FILED DEC. 5, 1914.
1,217,300.
Patented Feb. 27, 1917.
4 SHEETS—SHEET 1.
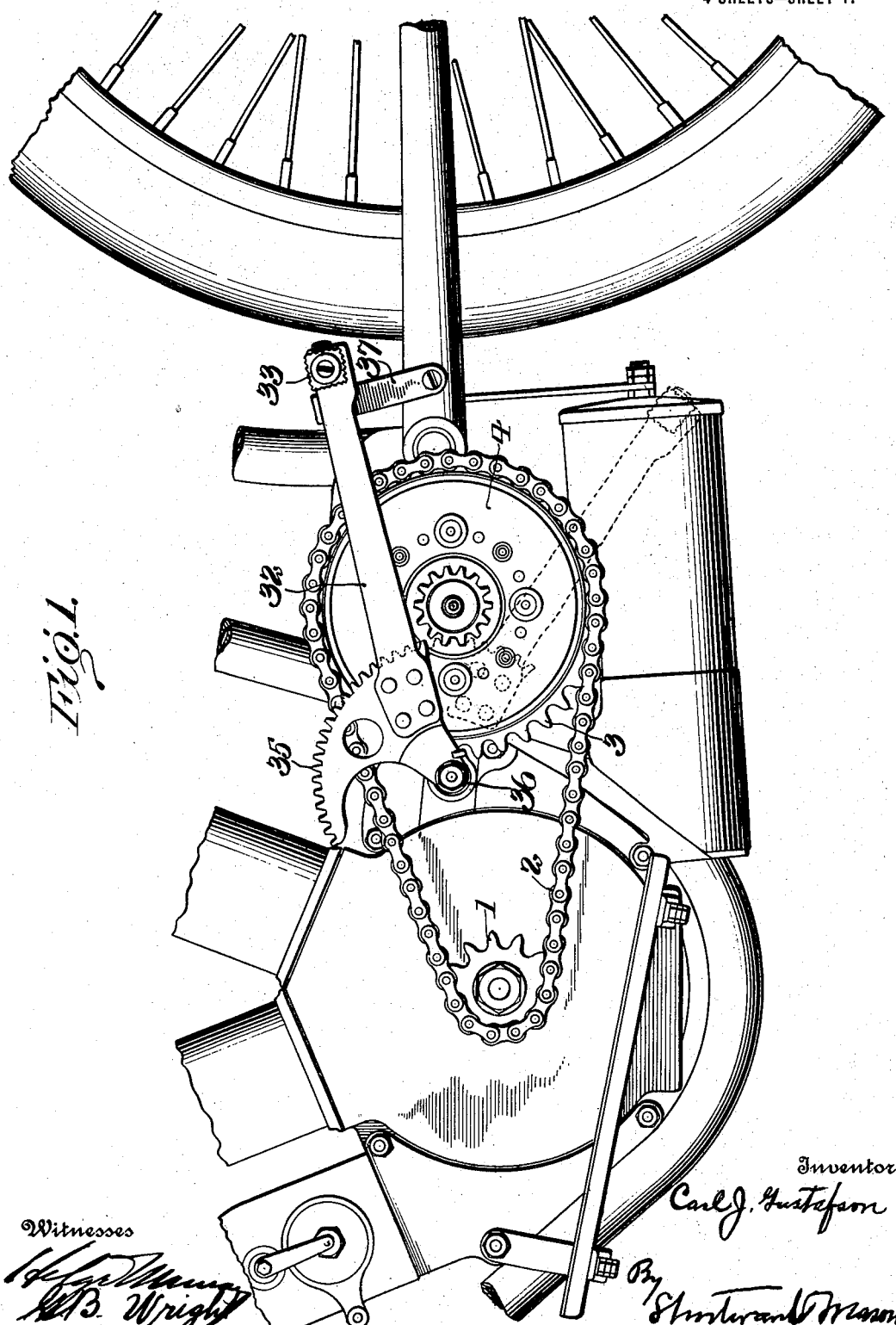

C. J. GUSTAFSON.
STARTING DEVICE FOR MOTOR CYCLES.
APPLICATION FILED DEC. 5, 1914.
1,217,300.
Patented Feb. 27, 1917.
4 SHEETS—SHEET 2.
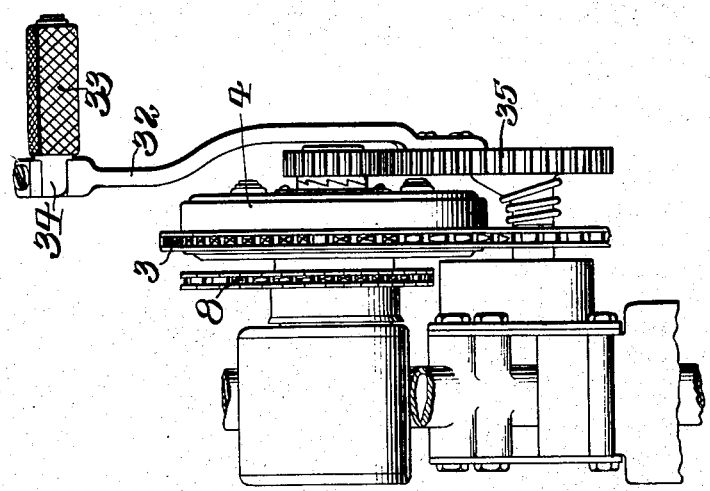
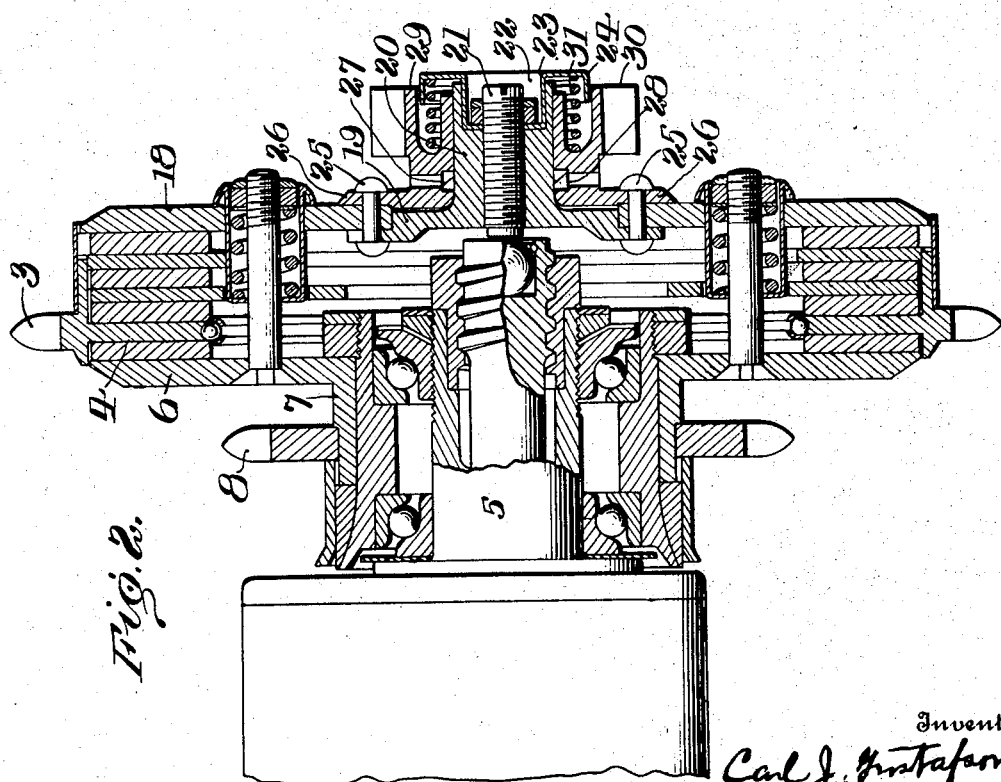

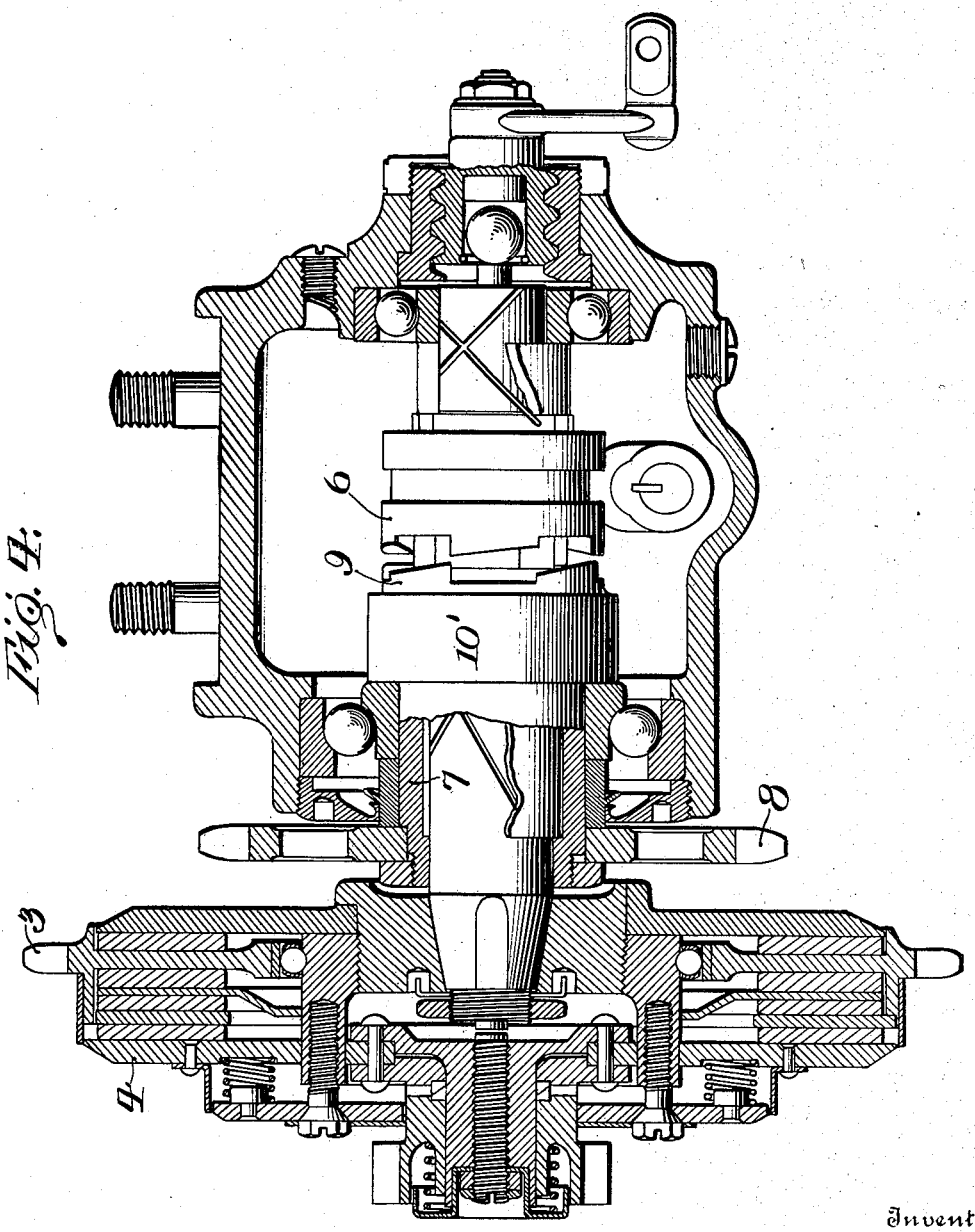

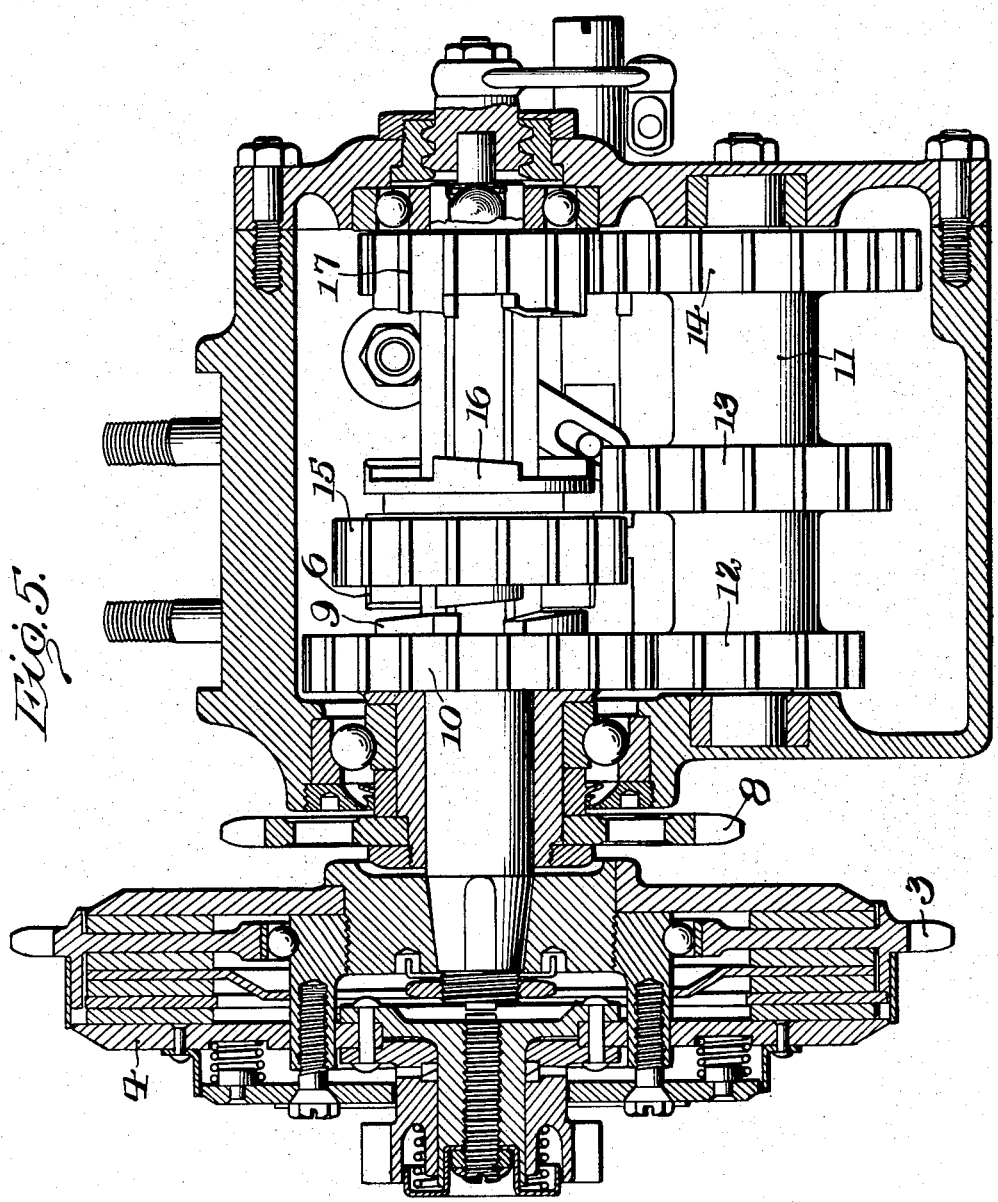

UNITED STATES PATENT OFFICE.

CARL JOHAN GUSTAFSON, OF SPRINGFIELD, MASSACHUSETTS, ASSIGNOR TO HENDEE MANUFACTURING COMPANY, OF SPRINGFIELD, MASSACHUSETTS, A CORPORATION OF MASSACHUSETTS.

STARTING DEVICE FOR MOTOR-CYCLES.

1,217,300.          Specification of Letters Patent.          Patented Feb. 27, 1917.

Application filed December 5, 1914. Serial No. 875,629.

*To all whom it may concern:*

Be it known that I, CARL JOHAN GUSTAFSON, a subject of the King of Sweden, residing at Springfield, in the county of Hampden, State of Massachusetts, have invented certain new and useful Improvements in Starting Devices for Motor-Cycles, of which the following is a description, reference being had to the accompanying drawing and to the figures of reference marked thereon.

My invention relates to improvements in starting devices for motor vehicles, and particularly to a starting device for motor-cycles.

An object of my invention is to provide a starting device for such vehicles in connection with a friction clutch, so arranged and located respecting each other, that the shock of back-firing of the engine will be absorbed by the clutch and not transmitted to the foot of the operator, in such event the friction plates of the clutch taking up the shock and the driven sprocket connected to the engine slipping on the clutch, the front plate of which is, of course, held from rotation by the starting crank.

A further object is to provide in connection with the main clutch, a clutch pinion normally operated to engage the main clutch to turn it and the engine, automatically disengaged from the main clutch when it is held by the starting crank and rotating with the main clutch when the starting crank is released.

A further object is to provide mechanism whereby the engine may be started with the rear wheel on the ground.

The invention, therefore, consists primarily of a starting device comprising a manually operated clutch member, and a friction clutch operated thereby in starting the motor and driving connections between the friction clutch and the motor, whereby in case of back fire the shock is absorbed by the friction clutch.

Further it consists of a starting device comprising a manually-operated clutching member, normally engaging a friction clutch for operating the same in starting and automatically disengaged therefrom during the return of the starting crank to normal position while the foot of the operator is on the starting crank.

The invention also consists of a starting device comprising a manually-operated lever, a friction clutch operated thereby, an engine shaft connected to the friction clutch, and a clutch device for connecting and disconnecting the friction clutch with the driving mechanism for the rear wheel, whereby the engine may be started with the rear wheel on the ground.

Finally, the invention consists in the matters hereinafter described and referred to in the appended claims.

The invention is illustrated in the accompanying drawings, in which—

Figure 1 is a side elevation of a portion of a motorcycle to which my invention is applied;

Fig. 2 is a sectional view through the clutch mechanism with the starting crank and quadrant removed;

Fig. 3 is a plan view of a portion of the mechanism shown in Fig. 1;

Fig. 4 is a sectional view of the mechanism as applied to a single speed transmission if desired to be used in starting when the rear wheel is on the ground;

Fig. 5 is a sectional view as applied to a three-speed transmission.

In these drawings, the engine shaft carries on its outer end the sprocket 1, which drives a sprocket chain 2 passing around the sprocket 3, which forms the free wheel of the clutch 4 when the latter is disengaged and the engine is running. This clutch 4 is of the spring closed multiple friction disk type illustrated in applications heretofore filed by me in the United States Patent Office, and also well known in the art as used on the "Indian" motorcycle, and, therefore, need not be more fully described, its operation being well understood in various arts.

The clutch is operated by a worm and horizontal sliding bar passing through a tunnel in the countershaft 5. It is carried on the end of such countershaft 5, and as shown in Fig. 2 the rear plate 6 of the clutch is extended to form a hub 7, on which is fixed a sprocket 8 which through a long chain drives the rear wheel. In this arrangement as shown in Fig. 2, when the clutch is closed and is rotating, the clutch and motor shaft revolve simultaneously, and the sprocket and rear wheel also revolve; thus it will be seen that in order to start the engine the rear wheel must be raised from the ground when the clutch is closed and rotated by the starting crank.

The preferred applications of my invention are, however, shown in Figs. 4 and 5 of the drawings, and they will be now described, although so far as the starting and prevention of shock from back firing is concerned, the invention is applicable to all the forms.

Referring now to these other figures, the countershaft 5 has a sliding dog 6 for a single speed mechanism, and two sliding dogs 6, 16, for a three-speed mechanism. Rotatably mounted on the counter shaft is a sleeve or hub 7, on which is fixed the sprocket 8 for driving the rear wheel. This hub also carries, as shown in Fig. 4, a ring 10' carrying a dog 9, and as shown in Fig. 5, a gear wheel 10 carrying a similar dog. When the sliding dog 6 engages the dog 9, the wheel 8 rotates, but when the dogs are out of engagement, the countershaft if driven from the engine rotates, but no rotation is imparted to the sprocket 8. In other words, when the transmission is in neutral, although engine and clutch are rotating, the rear wheel is not rotated, although resting on the ground when the starting device has been operated.

In the three-speed mechanism shown in Fig. 5, an idle shaft 11 with three gears 12, 13, 14 is employed and different speeds are given, the high through direct engagement of dogs 6 and 9; the second speed through gears 15, 13, 12 and 10; and the low through dog 16 engaging dog in gear 17; gears 14, 12 and 10. These dogs referred to form a clutch member between the main friction clutch and the sprocket which drives the rear wheel.

Attached to the outer plate 18 of the clutch proper 4, is the face 19 of a hub 20, having an interior bore to receive a bolt 21, and having a recess 22 in which fits the shank 23 of a cap piece 24.

A nut and jam nut around the bolt 21 hold the cap in place. Also secured to the plate 18 of the clutch by the same rivets 25 which clamp member 19 thereto, is a plate 26 haivng a ring of teeth 27 on its outer face to be engaged by corresponding teeth 28 on the inner face of the clutch member 29 which has a sliding movement on the hub 20. This clutch member has teeth 30 on its outer periphery and a recess to receive a spring 31 held thereon by the cap 23.

This toothed member is spring pressed inwardly by the spring 31 keeping the teeth 28 normally engaged with the teeth 27, and forms in effect a slidable clutch pinion, the pitch of the respective teeth 27 and 28 being such that when the pinion is rotated in one direction, the teeth will engage and thereby rotate the main clutch.

When backfiring takes place and the foot of the operator is on the starting crank, thus holding the outer plate of the clutch from rotation, the rotation of the main clutch in the opposite direction from its driving movement will cause the friction plates of the main clutch to slip and absorb the shock, the large sprocket slipping with respect to the rest of the clutch.

The foot starter 32 is a crank arm having at one end the foot rest 33 pivoted at 34 and adapted to be folded up out of the way when not in use. The crank at its other end is secured to a toothed quadrant pivoted to the machine and normally held with its teeth out of engagement with the pinion-clutch teeth by the coiled spring 36. A clip 37 holds the foot starter in convenient position.

In the construction shown in Fig. 2, in using the starter the rear wheel must be raised, as when the clutch is engaged to start the motor, the driving sprocket for the rear wheel must also rotate.

It will thus be seen that when the starting crank is forced down, the clutch pinion is rotated and the main clutch and engine shaft rotated. On backfiring, the main clutch rotates backward, and even if the quadrant is still in engagement with the pinion, through the operator not having taken his foot off the starting crank, the main clutch will absorb the shock, the outer plate being held from rotation by the foot of the operator, the friction plates slipping on each other and the large sprocket slipping on the main clutch. Also if backfiring does not take place, but the operator does not release his foot promptly, and holds the clutch pinion, the teeth on the main clutch will ride past the teeth on the clutch pinion, and when the quadrant passes out of engagement with the pinion, the main clutch by frictional engagement will rotate the clutch pinion without any clicking noise.

If desired to start the engine with the rear wheel of the machine on the ground instead of raised on its stand, the operation is as follows: The driving dog on the single speed is thrown out of mesh with the main driver on the countershaft, to which is rigidly connected the drive sprocket for the rear wheel, thus interrupting the drive to the main wheel. The clutch is engaged and, therefore, can be revolved with the motor. By pressing down on the foot lever, the quadrant engages the pinion, the teeth on the small clutch of the pinion drive the main clutch, and the entire clutch unit revolves with the motor, the motor being turned over three times to each stroke of the starting crank. When the motor picks up and becomes the driver, the clutch is released, the transmission thrown in, the clutch engaged again, and the driver sprocket moves to drive the rear wheel through the long chain.

When the starting crank is released on the bottom of its stroke, it is automatically returned to the starting position by the coiled spring, and when not in use held in position by the clip, the upward movement of the starting crank and the rotation of the pinion through the quadrant causing the teeth on the pinion clutch to ride over the teeth on the main clutch plate.

The operations on the two and three speed gears is just the same, the driving dog being thrown into neutral position when starting. In case of a backfire, the friction plates of the main clutch will absorb the greater portion of the shock, the plates slipping on each other and the large sprocket also slipping, and this is so even though the small pinion is held in engagement with the outer plate of the clutch by reason of the operator not taking his foot off quickly.

If desired to start the machine with the rear wheel raised on its stand, the operation is the same, except that the transmission is in mesh and does not have to be in neutral and the clutch is engaged, and does not have to be disengaged after starting to throw in the transmission, and then again engaged. So also the safety effect of the starting device is fully accomplished as set forth.

So far as I am aware, I am the first to provide a starting device which transmits the power through a friction clutch and driving connection to the motor, and in which in case of backfire, the shock is absorbed by the clutch.

So also I believe I am the first in connection with a starting mechanism operating the friction clutch, to turn over the engine to provide an engaging and disengaging member between the friction clutch and the rear wheel driving sprocket, whereby the engine may be started with the rear wheel on the ground.

Having thus described my invention, what I claim as new and desire to secure by Letters Patent, is:—

1. A motor vehicle including an engine, an engine shaft, a friction member, a connection between the friction member and the engine shaft, a second friction member engaging said first named friction member, springs for holding said friction members in engagement, a pinion having a ratchet connection with said second friction member, a segmental gear adapted to engage said pinion for rotating the same, and means for operating said segmental gear, the tension of said springs being such as to permit the friction member connected to the engine to slip on the other friction member in case of back fire of the engine.

2. A motor vehicle including an engine, an engine shaft, a countershaft parallel with said engine shaft, a driving sprocket on said countershaft connected to said engine shaft, a driven sprocket on said countershaft, friction members for connecting said driving sprocket to said driven sprocket, springs for normally holding said friction members in engagement, a pinion having a ratchet connection with said friction members, a foot lever, a spring for normally holding said foot lever raised, said foot lever having a segmental gear for engaging said pinion when depressed for starting the engine, the tension of said springs being such as to permit the driving sprocket to slip relative to said friction members in case of back fire of the engine.

3. A motor vehicle including an engine, an engine shaft, a friction clutch driven by the engine shaft, and a starting device connected to the friction clutch and operating therethrough for starting the engine, said starting device including a starting lever, a pinion adapted to be operated thereby, ratchet teeth on the inner face of said pinion, and ratchet teeth on the outer face of the friction clutch normally engaged thereby.

4. A motor vehicle including an engine, an engine shaft, a friction clutch driven thereby and including an outer plate, teeth carried by said outer plate, and a starting device including a starting lever, a pinion operated by said lever, said pinion having teeth on its inner face normally engaging the teeth from the outer plate of the friction clutch, whereby in back-firing the outer plate of the clutch may be held from rotation by the foot of the operator on the starting lever and the shock absorbed by the clutch, said teeth being so constructed that when the engine picks up the teeth will slip by each other, said starting lever in normal position being out of engagement with the pinion.

In testimony whereof, I affix my signature, in the presence of two witnesses.

CARL JOHAN GUSTAFSON.

Witnesses:
  JOHN T. CRONIN,
  JOHN D. STEPHENS.